Aug. 18, 1959     J. B. POLOMSKI     2,899,834
HYDRAULIC CONTROLS FOR TRANSMISSION

Filed Sept. 13, 1954     3 Sheets-Sheet 1

Inventor:
John B. Polomski
By:
Keith J. Bleuer
Atty.

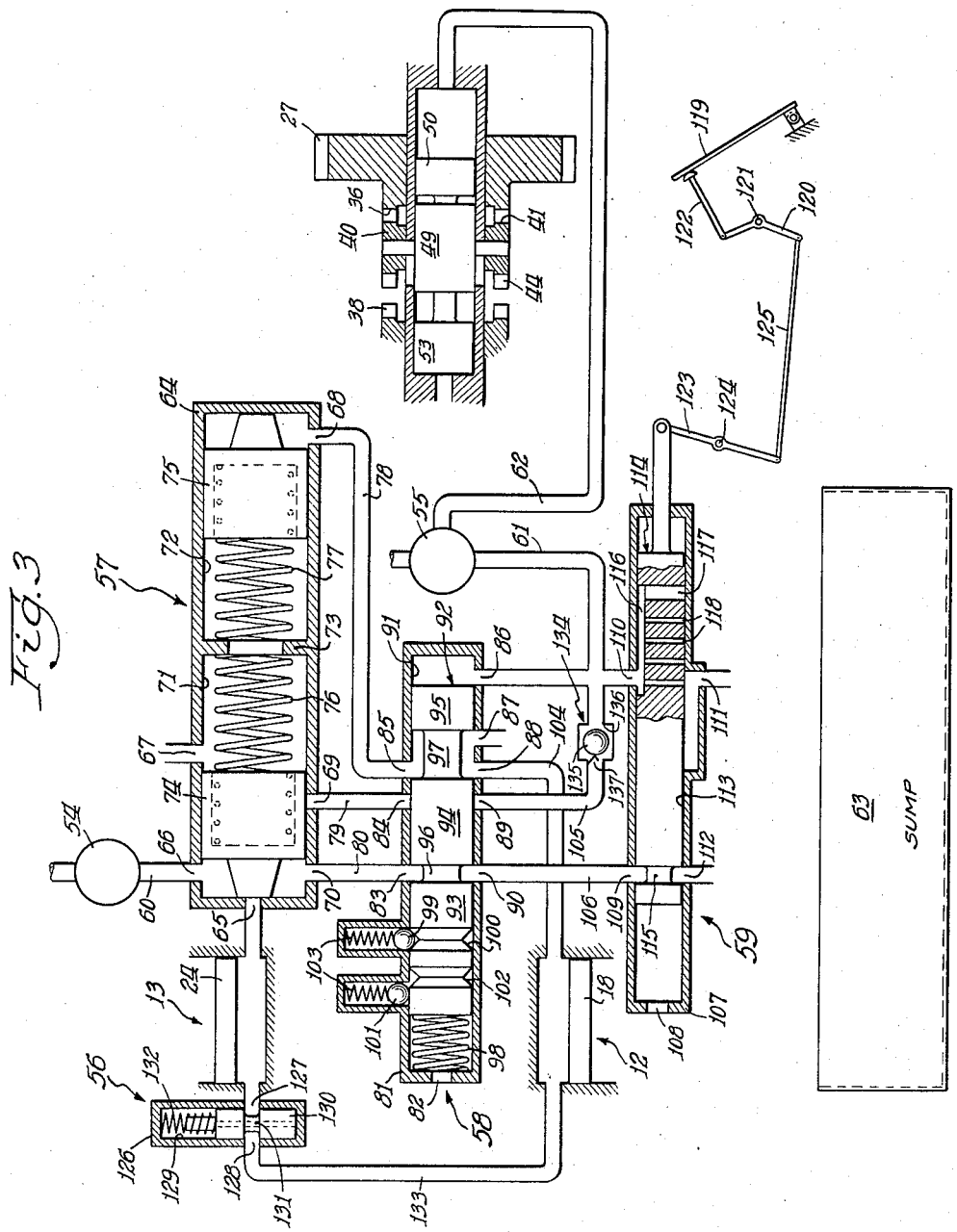

United States Patent Office 2,899,834
Patented Aug. 18, 1959

2,899,834

HYDRAULIC CONTROLS FOR TRANSMISSION

John B. Polomski, Detroit, Mich., assignor to Borg-Warner Corporation, Chicago, Ill., a corporation of Illinois Application September 13, 1954, Serial No. 455,513

7 Claims. (Cl. 74—472)

My invention relates to transmissions for automotive vehicles and more particularly to hydraulic controls for such transmissions.

It is an object of the invention to provide improved hydraulic transmission controls by means of which a change in speed ratio through a transmission may be obtained which is responsive to both the speed of the driven shaft of the transmission and also to the opening that is given by the vehicle operator to the vehicle engine throttle.

More particularly, it is an object of the invention to provide a shiftable speed ratio control member responsive to changes in pressure on it for changing drive through the transmission, with a pump driven from the driven shaft of the transmission being provided for supplying a shifting pressure to the shiftable member that increases with the speed of the driven shaft and with this pressure being modified by variable, pressure relieving, valving subject to the control of the vehicle accelerator. It is contemplated that this valving may preferably take the form of a control valve having a plurality of ports therethrough one or more of which are opened to relieve the output pressure of the driven shaft pump in accordance with throttle opening movement given the vehicle accelerator.

The invention consists of the novel constructions, arrangements, and devices to be hereinafter described and claimed for carrying out the above-stated objects and such other objects as will be apparent from the following description of a preferred embodiment of the invention, illustrated with reference to the accompanying drawings, wherein:

Fig. 3 is a schematic diagram of hydraulic control mechanism to be used with the transmission shown in Figs. 1 and 2 and embodying the principles of the invention.

Like characters of reference designate like parts in the several views.

Figure 1:
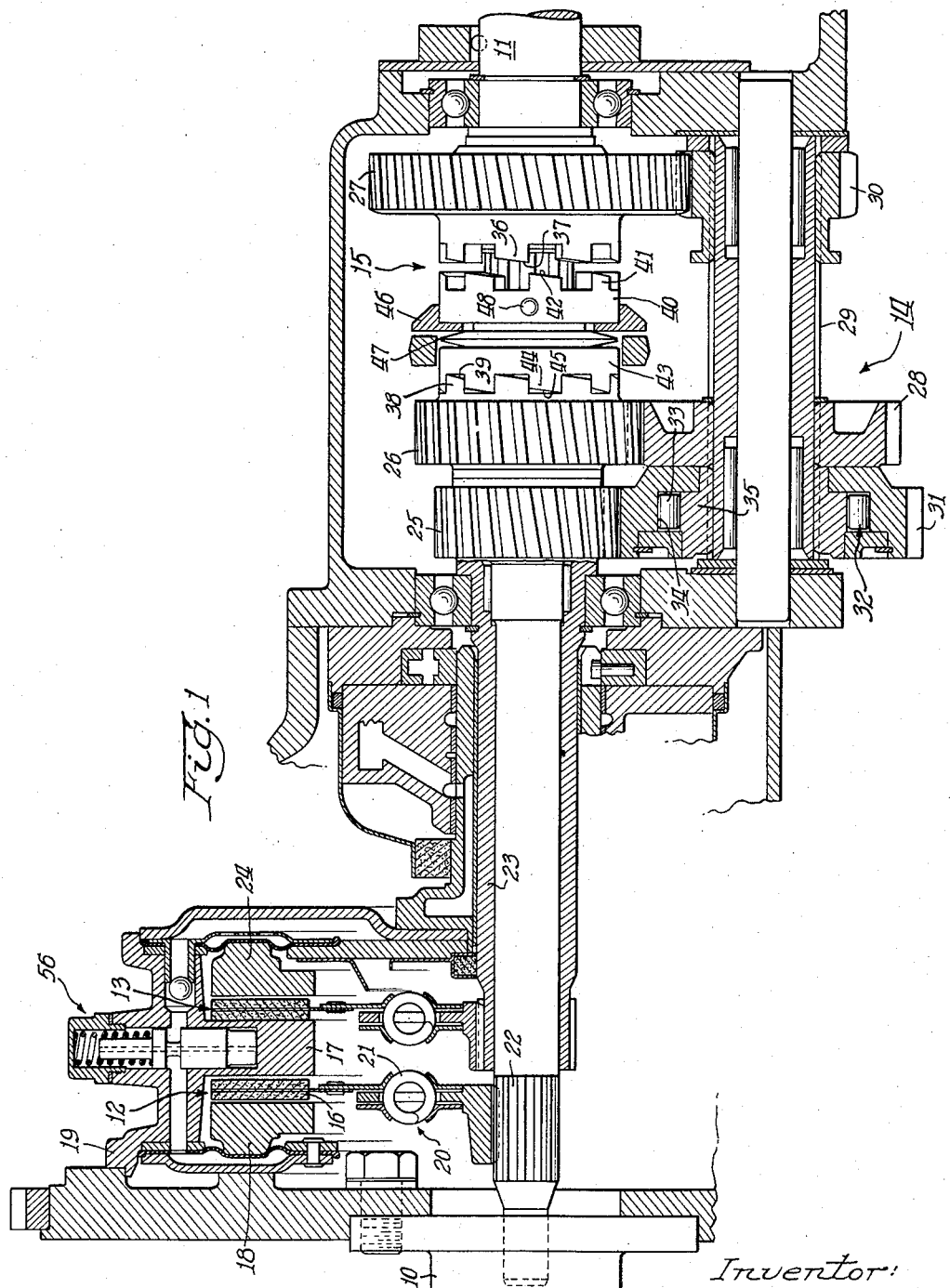
Fig. 1 is a longitudinal, sectional view through a transmission with which my improved controls may be used.

Referring now to the drawings, the illustrated transmission comprises a drive shaft 10, a driven shaft 11, a pair of friction clutches 12 and 13, countershaft gearing 14 and a positive type clutch 15.

The friction clutch 12 comprises a friction disc 16 adapted to be clamped between a fixed pressure plate 17 and a movable piston assembly 18, the plate 17 and piston assembly 18 being rotatable with a clutch housing 19 connected with the drive shaft 10. The clutch disc 16 is provided with a vibration dampener 20 comprising springs 21, which may be of any conventional design and hence need not further be described. The disc 16 is fixed on a shaft 22.

The clutch 13 is quite similar to the clutch 12 and also comprises a friction disc 16 which in this case is fixed on a quill shaft 23. The clutch 13 comprises a piston assembly 24, and the disc 16 for this clutch is clamped between the piston assembly 24 and the fixed pressure plate 17.

The countershaft gearing 14 comprises a gear 25 formed on the shaft 23 and a gear 26 formed on the shaft 22. A gear 27 is rotatably disposed on the driven shaft 11. A countershaft gear 28 is in mesh with the gear 26 and is fixed on a countershaft 29. A gear 30 is slidably splined on the countershaft 29 and is adapted to mesh with the gear 27. A gear 31 is rotatably disposed with respect to the shaft 29 and is in mesh with the gear 25. A one-way clutch 32 is provided between the gear 31 and the shaft 29. The one-way clutch 32 may be of any conventional design and may include rollers 33 disposed between a cylindrical race surface 34, provided in the gear 31, and a hub 35 splined on the countershaft 29 and provided with cammed surfaces on which the rollers 33 may wedge.

The clutch assembly 15 comprises axially extending clutch teeth 36 formed on the gear 27 and having beveled ends 37, axially extending clutch teeth 38 formed on the gear 26 and having ends 39 beveled in the same direction as the tooth ends 37, a sleeve 40 slidably splined on the shaft 11 and having teeth 41 with ends 42 beveled in the same direction as the tooth ends 37 and 39 and a second sleeve 43 splined on the sleeve 40 and having teeth 44 with ends 45 that are beveled in the same direction as the other teeth. A ring 46 is carried by the part 40, and a spring 47 is disposed between the ring 46 and the sleeve 43 for yieldably holding the parts 40 and 43 apart.

Figure 2:
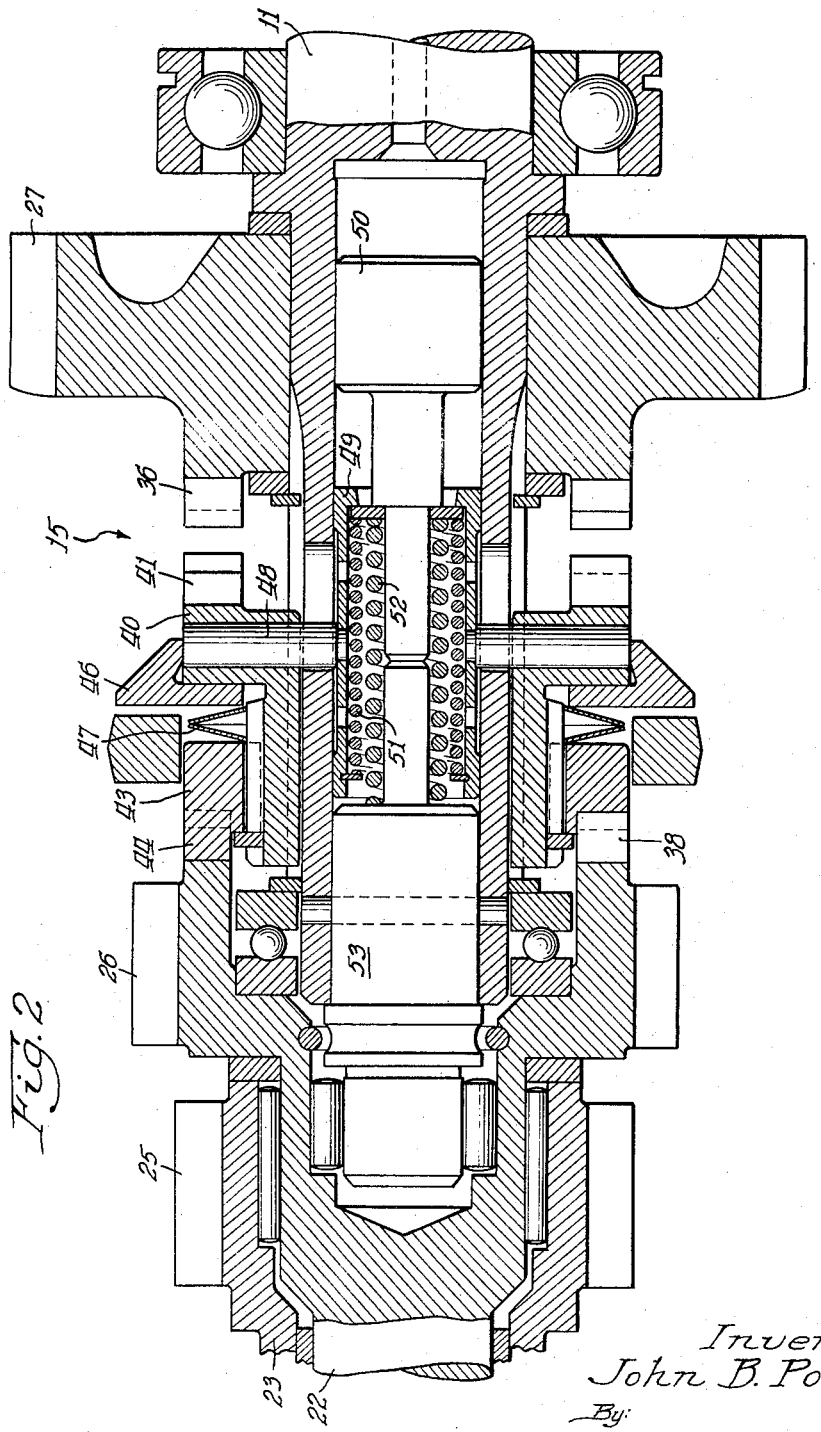
Fig. 2 is a longitudinal, sectional view on an enlarged scale of certain positive clutch mechanism in the transmission shown in Fig. 1.

The part 40 is provided with a plurality of pins 48 extending inwardly through slots in the shaft 11 into a sleeve 49 slidably disposed in a central cavity in the shaft 11. The sleeve 49 is actuated by a piston 50 also slidably disposed in the cavity, and a spring 51 is provided effectively between the parts 50 and 49 so that movement of the piston 50 to the left as seen in Fig. 2 puts a corresponding force on the sleeve 49 through the spring 51. A spring 52 is provided between the piston 50 and a stationary part 53 fixed in the central cavity in the shaft 11 for returning the piston 50.

The controls for the transmission comprise, in general, a front pump 54 driven by the drive shaft 10 of the transmission and a rear pump 55 driven by the driven shaft 11 of the transmission, a centrifugal clutch control valve 56, an accumulator 57, a shift ratio control valve 58 and an accelerator controlled valve 59.

The pumps 54 and 55 are conventional fixed displacement pumps of any suitable type, such as pumps having two toothed gear-like elements in mesh that pump by virtue of fluid carried between the teeth, and the pumps are hence not further described in detail. The pump 54 discharges fluid into a conduit 60, and the pump 55 discharges fluid into conduits 61 and 62. The conduit 62 is connected with the piston 50, as shown. Both of the pumps 54 and 55 are adapted to draw fluid out of a suitable sump 63 located at any suitable place, such as beneath the gearing 14, for example.

The accumulator 57 comprises a casing portion 64 having ports 65, 66, 67, 68, 69 and 70. The casing portion is provided with cylindrical cavities 71 and 72 therein separated by a partition 73, and a pair of pistons 74 and 75 are respectively slidably disposed in the cavities 71 and 72. A pair of springs 76 and 77 are disposed respectively between the partition 73 and the pistons 74 and 75 for yieldably holding the pistons at the limit of their movment toward the adjacent ends of the cavities 71 and 72.

The port 65 is connected to the piston assembly 24 for the clutch 13; the port 66 is connected to the outlet conduit 60 for the pump 54; the port 67 is a bleed port freely discharging into the sump 63; the port 68 is connected to a conduit 78; the port 69 is connected to a conduit 79; and the port 70 is connected to a conduit 80.

The shift valve 58 comprises a casing portion 81 having ports 82, 83, 84, 85, 86, 87, 88, 89 and 90. The casing portion is provided with a cylindrical cavity 91 therein, and a piston 92 is slidably disposed in the cavity 91. The piston 92 is provided with lands 93, 94 and 95 separated by grooves 96 and 97. A compression spring 98 is disposed between the end of the piston 92 and the adjacent end of the cavity 91 for yieldably holding the piston in the position in which it is illustrated.

A detent ball 99 fitting in a peripheral slot 100 in the piston 92 is provided for yieldably holding the piston in its illustrated position, and a second detent ball 101 is adapted to fit in a peripheral slot 102 for holding the piston in a second position. Springs 103 are provided for acting on the balls 99 and 101.

The port 82 is a bleed port; the port 83 is connected with the conduit 80; the port 84 is connected with the conduit 79; the port 85 is connected with the conduit 78; the port 86 is connected with the conduit 61; the port 87 is a bleed port; the port 88 is connected with a conduit 104; the port 89 is connected with a conduit 105 that in turn is connected with the conduit 61; and the port 90 is connected with a conduit 106.

The accelerator valve 59 comprises a valve casing 107 having ports 108, 109, 110, 111 and 112. It will be noted that the port 111 is relatively elongated with respect to the other ports. The casing 107 is provided with a cylindrical cavity 113 therein, and a piston 114 is slidably disposed in the cavity 113. The piston 114 is provided with a peripheral groove 115, a slot 116 which is relatively elongated and extends along an edge of the piston 114, a relatively large diameter opening 117 through the piston connected with the slot 116 and additional relatively small diameter openings 118 through the piston 114 and connected also with the slot 116.

The port 108 is a bleed port; the port 109 is connected with the conduit 106; the port 110 is connected with the conduit 61; and the ports 111 and 112 are bleed ports.

The piston 114 is adapted to be controlled by the vehicle accelerator 119. Any suitable connections may be provided between the accelerator 119 and the piston 114 which function to move the piston 114 to the left as seen in the drawing when the accelerator 119 is depressed towards an open throttle position. The connections may comprise a bell crank 120 pivoted at 121 and moved by the accelerator 119 through a link 122. A lever 123 pivoted at 124 is connected at one end with the piston 114 and is connected at its other end to the bell crank 120 by means of a link 125.

The port 65 of the accumulator 57 is connected to the piston assembly 24 of the clutch 13, and the piston assembly 24 is also connected to the centrifugal valve 56. The centrifugal valve 56 is carried by the clutch housing 19 and thus rotates in accordance with the speed of the drive shaft 10. The centrifugal valve 56 comprises a casing portion 126 having ports 127 and 128 and a cylindrical cavity 129. A piston 130 having a peripheral groove 131 is slidably disposed in the cavity 129, and a spring 132 is provided in the cavity 129 between the outer end of the cavity and the adjacent end of the piston 130. The valve piston 130 is subject to the centrifugal force due to rotation of the drive shaft 10 and the clutch housing 19 such that the piston 130 tends to move outwardly against the action of the spring 132 upon increases in speed of rotation of the shaft 10 and clutch housing 19. The valve 56 is connected by conduit 133 with the piston assembly 18 for the clutch 12 and this piston assembly 18 is also connected to the conduit 104, as shown.

A check valve 134 is disposed between the conduits 61 and 105. The valve 134 comprises a ball 135 adapted to rest on a seat 136 and thus close the conduit 105, when the flow of fluid tends to be from conduit 105 to conduit 61, and a ball retainer 137 for holding the check valve 134 open when the flow of fluid is in the opposite direction.

In operation, it is assumed that the gear 30 is in mesh with the gear 27, and the transmission controls will, upon depression of the vehicle accelerator in a throttle opening direction, complete the low or first speed power train. The second speed power train will automatically be completed when the vehicle reaches a predetermined speed, and a subsequent completion of the fourth speed power train will be obtained by releasing the accelerator pedal for a short time. A subsequent downshift from fourth speed ratio to third speed ratio will be obtained by moving the accelerator to an open throttle position.

When the accelerator is initially depressed from closed throttle position toward open throttle position, it will, through the levers 120 and 123 and links 122 and 125, cause a movement of the accelerator control piston 114 to the left so as to close the ports 109 and 112 with respect to the conduit 106 and the pump 54. At the same time, since the throttle is being opened, the shaft 10 will rotate faster, and the pump 54 supplies an increasing volume of fluid into the conduit 60. The output pressure of the pump 54 increases and causes the piston 74 of the accumulator 57 to move to the right against the action of the spring 76 to open the port 65 to the clutch piston assembly 24. The piston assembly 24 is, at idling speeds of the drive shaft 10, connected through the port 127, the valve groove 131, the port 128, the conduit 133, the conduit 104, the port 88, the groove 97 and the port 87 to the sump 63; however, as the speed of the drive shaft 10 increases, the piston 130 moves outwardly under the action of centrifugal force against the action of its spring 132 to close the ports 127 and 128. An increasing pressure is thus put on the piston assembly 24, and this causes an engagement of the clutch 13 with an engagement of its pressure plate 16 between the piston 24 and the fixed pressure plate 17. The first speed power train is thus completed, this train being through the clutch 13, shaft 23, gears 25 and 31, one-way clutch 32, countershaft 29, gears 30 and 27 and clutch teeth 36 and 41 to the driven shaft 11.

The rise of fluid pressure on the clutch piston assembly 24 and thus the increasing engagement of the clutch 13 is controlled by the accumulator 57 acting in conjunction with the centrifugal valve 56 to cause the fluid pressure and clutch engagement increases to be relatively gradual and smooth. As the pressure builds up on the piston assembly 24, the piston 74 moves farther to the right as seen in Fig. 3 against the action of the spring 76 so that the casing portion 64 and the piston 74 act as a fluid accumulator. In addition, the centrifugal valve 56 meters fluid flow through the ports 127 and 128 and from thence through the conduits and ports previously described to the sump 63, the metering action being relatively prolonged for lower engine speeds as compared to higher engine speeds. The centrifugal valve 56 and the accumulator 57 thus cooperate to provide a smooth and gradual starting engagement of the clutch 13. Eventually, the piston 74 moves sufficiently against the action of the spring 76 to open the bleed port 67, and subsequently the fluid pressure on the piston assembly 24 can increase no further, any excess fluid being released through the bleed port 67.

As the speed of the vehicle in low speed drive increases, the speed of the driven shaft pump 55 and its fluid pressure output coordinately increases. This fluid pressure in conduits 61 and 62 is controlled by the valve 114 that opens one or more of the small diameter openings 118 between the port 110 and the port 111. If only one of the openings 118 is opened between these two ports, the fluid pressure in the conduits 61 and 62 increases rather abruptly with increases in driven shaft speed, while if two or more of these small diameter openings 118 are connected between the ports 110 and 111, the increase in fluid pressure in the conduits 61 and 62 is less abrupt with increases in vehicle speed. The speed responsive fluid pressure in the conduit 61 is impressed on the right end of the piston 92 in the shift valve 58, and this pressure tends to move the piston 92 to the left. When the fluid pressure in the conduit 61 from the pump 55 becomes sufficiently high, this movment of the piston 92 takes place so that the detent ball 101 enters the groove 102. In this position of the piston 92, its groove 97 connects the ports 84, 85, 88 and 89. Fluid pressure from the front pump is available to the groove 97 through the ports 66 and 69, conduit 79 and port 84, when the piston 74 is metering fluid through the bleed orifice 67 as previously described, and fluid under pressure is also available from the rear pump 55 discharging through the conduit 61, the check valve 134, conduit 105 and port 89. Fluid under pressure flows through the groove 97 from the ports 84 and 89, port 88 and conduit 104 to the clutch piston assembly 18, the centrifugal valve 56 at this time closing the port 28 connected by the conduit 133 with the piston assembly 18. The piston assembly 18 is then effective to engage the clutch 12, and the application of the clutch is rendered relatively slow and soft due to the action of the piston 75 of the accumulator 57. This piston 75 is connected through the groove 97, port 85, conduit 78 and port 68 with the source of fluid to the piston assembly 18, and once the valve piston 92 has moved, the build up of fluid pressure causes the accumulator piston 75 to move to the left against its spring 77. Since the cavity 72 is of substantial cross section, the accumulator piston 75 causes a relatively slow increase in fluid pressure effective on the piston assembly 18 to take place. When full engagement of the clutch 12 has taken place, the maximum output pressure of the pumps connected through conduit 61, check valve 134, conduit 105, port 89, groove 97, port 84, conduit 79 and port 69 is regulated by the accumulator piston 74 the same as in low speed drive for the front pump 54 only.

Second forward drive completed by the clutch 12 is from the drive shaft 10, the clutch 12, the shaft 22, the gear 26, the gear 28, the countershaft 29, the gears 30 and 27, and the clutch teeth 36 and 41 to the driven shaft 11. The clutch 13 remains engaged; however, the low speed power train is broken by the one-way clutch 32 which overruns at this time.

The fluid pressure output of the pump 55 regulated by the accumulator piston 75 is expressed through the conduit 62 on the piston 50, and this fluid pressure moves the piston 50 to the left as seen in Fig. 2 against the action of the springs 51 and 52. The spring 51 tends to move the teeth 41 out of engagement with the teeth 36 through the sleeve 49, the pins 48 and the clutch part 40, however, since there is torque being transmitted at this time through the teeth in second speed forward drive, the teeth remain engaged to transmit this drive.

If the vehicle operator now releases the accelerator 119, the torque transmitted through the clutch teeth 36 and 41 terminates, and the teeth disengage. The part 40 at this time moves to the limit of its movement to the left under the action of the spring 51, and the teeth 38 and 44 ratchet on each other, with the spring 47 being compressed and holding the part 43 in ratcheting condition with respect to the teeth 38. This ratcheting continues as long as the drive shaft 10 is rotating faster than the driven shaft 11 but when the speed of the vehicle engine and the drive shaft 10 drops to the speed of the driven shaft 11 and just slightly below this speed, at this time the relative rotation between the teeth 44 and 38 reverses, and the teeth intermesh. Until such reversal of relative rotation, the chamfered ends 39 and 45 of the teeth are effective to maintain the teeth out of mesh against the action of the spring 47, which under these conditions, tends to move the part 43 into tooth meshing position. When the teeth 38 and 44 are thus engaged, the fourth speed or direct drive between the shafts is effective, the drive being from the drive shaft 10 through the clutch 12, the shaft 22, the gear 26, the teeth 38 and 44, and the clutch assembly 15 to the driven shaft 11.

If the vehicle operator desires to change the drive from fourth speed ratio to third speed ratio, he may do so by moving the accelerator 119 to a fully opened throttle position so as to cause the valve 114 to move to the left to open all of the small diameter passages 118 and also the large diameter passage 117 to the port 111. This has the result of so reducing the output pressure of the driven shaft pump 55 that the spring 98 is effective on the shift valve piston 92 to move the piston 92 back into its illustrated position with the detent ball 99 in the detent groove 100. At this time, the groove 97 of the piston 92 communicates with the ports 87, 88 and 85, and the piston assembly 18 as well as the right end of the accumulator 57 are drained through the port 87 to the sump 63. The clutch assembly 15 remains in the same condition as for fourth speed drive; however, the drive instead of being through the clutch 12 is now through the clutch 13, and third speed drive is effective. The drive in this speed ratio is from the drive shaft 10 through the clutch 13, the shaft 23, the gears 25 and 31, the one-way clutch 32, the countershaft 29, the gears 28 and 26, the clutch teeth 44 and 38, and the clutch part 40 to the driven shaft 11. Under these downshifting conditions, the piston 92 closes the ports 84 and 89 so that the accumulator piston 74 is effective to regulate the pressure output of the drive shaft pump 54, as before, for maintaining the clutch 13 engaged.

The check valve 134 functions to prevent communication between the front pump 54 and the rear pump 55 through the port 66, the cavity 71, port 69, conduit 79, port 84, groove 97, port 89, and conduits 105 and 61, when the shaft valve piston 92 is in its high speed position and the piston 74 has been moved to the right against its spring 76 for regulating the pressure output of the front pump 54, in order that the speed responsive function of the driven shaft pump 55, prior to a change from second to fourth speed drive, is not interfered with. However, when the vehicle engine is inoperative for any reason, and it is desired to utilize the output pressure of the driven shaft pump 55 for starting the vehicle engine, in this case the check valve 134 permits fluid flow to the left from the conduit 61 to the conduit 105, and assuming that the pressure from the driven shaft pump 55 has become sufficient, the shift valve piston 92 is moved to the left with its groove 97 connecting the ports 89 and 88, and fluid under pressure will thus be supplied to the clutch piston assemblies 18 and 24 for starting the vehicle engine.

The accelerator controlled valve 59 advantageously, in conjunction with the driven shaft pump 55, provides a controlling fluid pressure that increases with the speed of the driven shaft of the transmission and decreases with increasing throttle opening by the vehicle operator. This pressure is advantageously used to control the shift valve piston 92 and also to control the piston 50 for the clutch assembly 15 for rendering the engagement of both the friction clutch 12 and also the positive clutch assembly 15 responsive to the speed of the vehicle and also responsive to the extent of accelerator depression and throttle opening.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism for an automotive vehicle having an accelerator, the combination of a drive shaft, a driven shaft, means providing a plurality of different speed ratio power trains between said shafts, fluid pressure responsive means for changing from one of said power trains to another of said power trains, a pump driven by one of said shafts and connected to said fluid pressure responsive means for applying pressure thereto that varies with the speed of said last-named shaft, and a valve connected to and under the control of said accelerator for providing a variable sized fluid pressure relief for said pump and thereby modifying the pressure from said pump applied to said fluid pressure responsive means according to accelerator position.

2. In transmission mechanism for an automotive vehicle having an accelerator, the combination of a drive shaft, a driven shaft, means providing a plurality of different speed ratio power trains between said shafts, shift control means for changing from one of said power trains to another and including a control member shiftable by fluid pressure from one speed ratio position to another speed ratio position, a spring acting on said control member yieldably holding it in its said one position, a pump driven by said driven shaft and connected to said shift control means to apply shifting pressure to said member that increases with driven shaft speed, and a valve connected to and under the control of said accelerator for providing a variable sized fluid pressure relief for said pump and thereby modifying the pressure from said pump applied to said control member according to accelerator position.

3. In transmission mechanism for an automotive vehicle having an accelerator, the combination of a drive shaft, a driven shaft, means providing a plurality of different speed ratio power trains between said shafts, fluid pressure responsive means, means for changing from one of said power trains to another of said power trains and including a pump driven by one of said shafts and connected to said fluid pressure responsive means for applying pressure thereto that increases with the speed of said last-named shaft, and a valve connected to and under the control of said accelerator and having at least one orifice that is opened as the accelerator is moved from a relatively closed throttle position to a relatively open throttle position for modifying the pressure from said pump applied to said fluid pressure responsive means according to accelerator position.

4. In transmission mechanism for an automotive vehicle having an accelerator, the combination of a drive shaft, a driven shaft, means providing a plurality of different speed ratio power trains between said shafts, shift control means for changing from one of said power trains to another and including a control member shiftable by fluid pressure from one speed ratio position to another speed ratio position, a spring acting on said control member yieldably holding it in its said one speed ratio position, a pump driven by said driven shaft and connected to said shift control means to apply shifting pressure to said member that varies with driven shaft speed, and a valve connected to and under the control of said accelerator and having at least one restricted orifice that is progressively opened to relieve the fluid pressure from said pump as the accelerator is moved toward open throttle position for thereby modifying the pressure from said pump applied to said control member according to accelerator position.

5. In transmission mechanism for an automotive vehicle having an accelerator, the combination of a drive shaft, a driven shaft, gearing for providing a relatively low speed ratio power train and a relatively high speed ratio power train between said shafts, said high speed power trains being completed by a fluid pressure engaged friction engaging mechanism, means for changing from said low speed power train to said high speed power train and including a shift valve for applying a fluid pressure to said friction engaging mechanism when said shift valve is moved from a low speed ratio position, a pump driven by said driven shaft and connected to said shift valve to apply a shifting pressure to the valve that increases with increases in speed of said driven shaft, and a valve connected to and under the control of said accelerator for progressively opening up a relief for the output of said pump as the accelerator is moved toward an open throttle position and thereby decreasing the pressure from said pump applied to said shift valve as the accelerator is moved toward an open throttle position.

6. In transmission mechanism for an automotive vehicle having an accelerator, the combination of a drive shaft, a driven shaft, means providing a relatively low speed ratio power train and a relatively high speed ratio power train between said shafts and including a positive clutch for completing said high speed power train when engaged, a fluid pressure actuator for said clutch a pump driven by said driven shaft and connected to said actuator to apply pressure tending to shift the clutch into its engaged condition, and a valve connected to and under the control of said accelerator for providing a fluid pressure relief that increases with movement of the accelerator in a throttle opening direction for thereby reducing the pressure from said pump applied to said actuator when the accelerator is moved toward an open throttle position.

7. In transmission mechanism for an automotive vehicle having an accelerator, the combination of a drive shaft, a driven shaft, means providing a relatively low speed ratio power train and a relatively high speed ratio power train between said shafts and including dual position positive clutch means for completing said low speed power train in a first position and for completing said high speed power train in a second position, a spring yieldably holding said clutch means in its said first position, a fluid pressure responsive piston effective for moving said clutch means from its first position to its second position, a pump driven by said driven shaft and connected to said piston to apply shifting pressure thereto that increases with driven shaft speed, and a valve connected to and under the control of said accelerator for providing a fluid pressure relief that increases with movement of the accelerator in a throttle opening direction for thereby reducing the pressure from said pump applied to said piston when the accelerator is moved toward an open throttle position.

References Cited in the file of this patent

UNITED STATES PATENTS

| | | |
|---|---|---|
| 2,159,170 | Maybach | May 23, 1939 |
| 2,450,161 | Price | Sept. 28, 1948 |
| 2,567,042 | Wemp | Sept. 4, 1951 |
| 2,604,197 | Livermore | July 22, 1952 |
| 2,627,189 | McFarland | Feb. 3, 1953 |
| 2,629,265 | Dodge | Feb. 24, 1953 |
| 2,692,511 | Nallinger | Oct. 26, 1954 |